United States Patent
Krekelberg

[11] Patent Number: 5,855,343
[45] Date of Patent: Jan. 5, 1999

[54] CAMERA CLIP

[75] Inventor: David E. Krekelberg, Minnetonka, Minn.

[73] Assignee: iREZ Research, Corporation, Minnetonka, Minn.

[21] Appl. No.: 814,168

[22] Filed: Mar. 7, 1997

[51] Int. Cl.⁶ .................................................. A47G 29/00
[52] U.S. Cl. .......................... 248/121; 248/126; 248/918
[58] Field of Search ................................... 248/121, 126, 248/440.1, 166, 176.1, 688, 918; 224/908; 396/421, 422, 423, 424, 425, 426, 427, 428

[56] References Cited

U.S. PATENT DOCUMENTS 1,208,344  12/1916  McAll ..................................... 248/126

*Primary Examiner*—Ramon O. Ramirez
*Assistant Examiner*—Long Dinh Phan
*Attorney, Agent, or Firm*—Nawrocki, Rooney & Sivertson, P.A.

[57] ABSTRACT

A clip for supporting a portable camera either on a surface or on an edge of a housing, and for protecting the lens of the camera when the camera is not being supported. The clip provides two axis of rotation to position the camera to any desired viewing angle. The clip may be rotated to a first position to support the camera on a surface of a table or desk. The clip may be rotated to a second position to support the camera on the display screen of a laptop computer. When the camera is not being supported in the first position or the second position, the camera may be rotated to be releasably held by the clip to protect the camera and lens during storage.

21 Claims, 2 Drawing Sheets

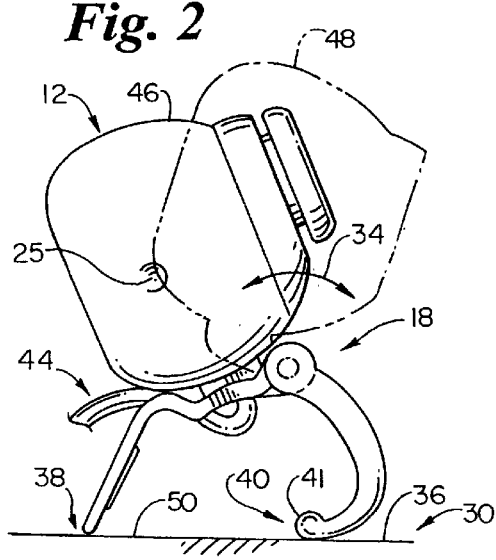
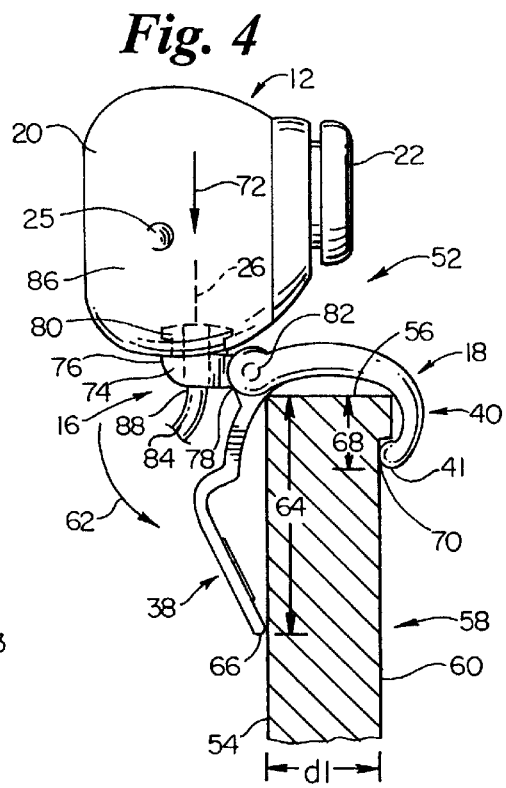

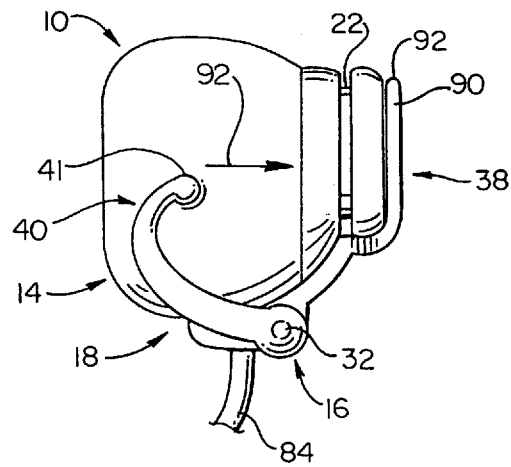
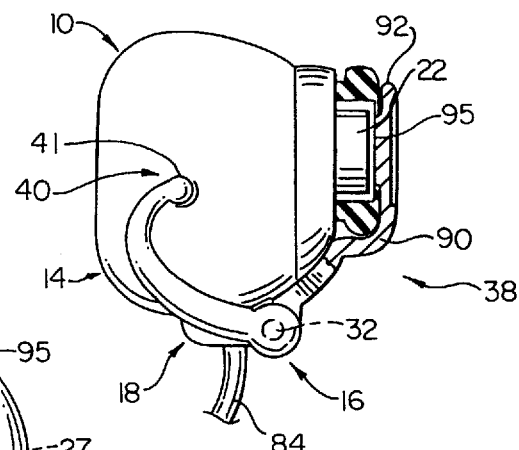
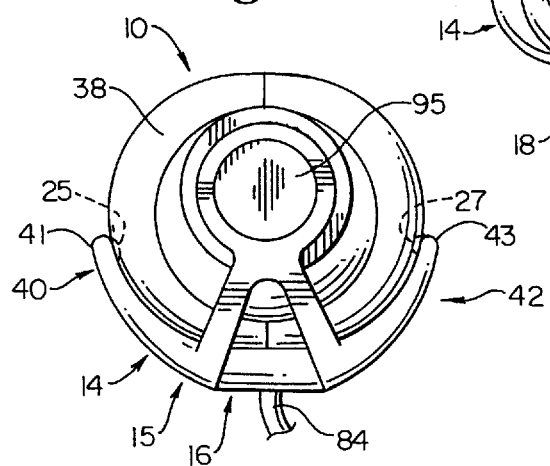

CAMERA CLIP

FIELD OF THE INVENTION

This invention relates to a clip for holding a camera. More particularly it relates to a clip for supporting a portable camera either on a surface or on an edge of a housing, and for protecting the lens of the camera when the camera is not being supported.

BACKGROUND OF THE INVENTION

With portable cameras, it is desirable to have an apparatus which can support the camera in any number of desired configurations. The apparatus must easily accommodate repositioning the camera to new orientations during use, and must be easily transportable. This is especially true when using the camera with a portable computer, such as a laptop computer. With increasing improvements in technology, both the laptop computer and camera have become smaller over time, emphasizing the need for a compatible camera support apparatus. The camera support apparatus must be versatile, light in weight, and be easily transportable to accommodate the new camera and laptop designs, and must desirably facilitate easy and safe storage of the camera. Often times portable computers are stored in carry bags which may be fully loaded with other hardware devices, such as disk drives or printers, as well as with personal effects, making for cramped storage conditions. The camera support apparatus must desirably protect the camera from damage during transport under these cramped storage conditions to avoid the necessity for separate storage means in order to maintain camera portability.

In the past, camera support apparatus were not easily transportable. Often times these apparatus utilized designs which incorporated a tripod approach, or which used one or more telescoping arms to support the camera. These designs attempted to support the camera during use, and then collapse to a smaller size to facilitate storage or transportation. While these designs were transportable, often times even the collapsed size of the prior art camera support apparatus could not be easily accommodated by a laptop computer bag. These prior art apparatus also did not provide means to protect the camera during transport, and if constructed of hard, exposed materials, tended to damage the cameras.

Another problem with prior art camera support apparatus was that they could not easily accommodate the variety of applications desired for portable cameras. These applications ranged from supporting the camera on the surface of a desk or table to supporting the camera on the upright display screen of a laptop computer. With the prior art, often times more than one camera support apparatus was necessary in order to support the desired range of applications. This unfortunately adversely impacted portability of the camera.

Thus, a desire was created within the industry for a small, easily transportable camera support apparatus for supporting the camera on both horizontal surfaces, such as the surface of a desk or table, and vertical surfaces, such as the display screen of a laptop computer, and to protect the camera during storage and transport.

SUMMARY OF THE INVENTION

Accordingly, it is an object of the invention to provide a clip for supporting a portable camera either on a surface or on an edge of a housing, and for protecting the lens of the camera when the camera is not being supported. The clip provides two axis of rotation to position the camera to any desired viewing angle. The clip may be rotated to a first position to support the camera on a surface of a table or desk. The clip may be rotated to a second position to support the camera on a display screen of a laptop computer. When the camera is not being supported in the first position or the second position, the camera may be rotated to be releasably held by the clip to protect the camera and lens during storage.

In a preferred embodiment of the present invention, an apparatus is provided for supporting a camera on an object where the apparatus comprises a hinge member and a support frame. The hinge member is rotatably attached to the camera where the camera rotates over a first axis of rotation relative to the hinge member. A support frame is hingedly attached to the hinge member to engagingly support the hinge member on the object, where the hinge member rotates over a second axis of rotation relative to the support frame. The first axis of rotation is perpendicular to the second axis of rotation, and the second axis of rotation is substantially parallel to a first surface of the object when the hinge member is engagingly supported on the object. In the preferred embodiment, the support frame further has a rear support element and first and second front support elements. In the preferred embodiment, the rear support element and the first and second front support elements support the camera in the first position on the first surface when the rear support element and the first and second front support elements are engaging the first surface when the first surface is substantially level. In the preferred embodiment, the rear support element and the first and second front support elements engage the first surface at three locations in a plane of the first surface to prevent rotation of the support frame relative to the first surface in any direction within the plane of the first surface. In the preferred embodiment, when the support frame is in the first position, the object may be the top of a table where the first surface is a top surface of the table. The object may also be a desk top where the first surface is a top surface of the desk.

In the preferred embodiment, the rear support element and the first and second front support elements support the camera in a second position on the first surface adjacent an edge when the first surface is inclined from the substantially level position. The object has a second surface wherein a thickness between the first surface and the second surface defines an edge therebetween. The camera is maintained adjacent to the edge in the second position where the uppermost portion of the object is the edge. The rear support element engages a first surface and the first and second support elements engage the edge and the second surface. The rear support element and the first and second front support elements, in combination, maintain the camera adjacent the edge and prevent rotation of the support frame along an axis substantially parallel to the second axis where the second axis is substantially parallel to the edge. In a preferred embodiment, the rear support element and the first and second front support elements support the camera in the second position on the first surface adjacent the edge when a first distance from the edge to the position where the rear support element engages the first surface is greater than a second distance from the edge to the position where the first and second front support elements engage the second surface. A center of gravity of the camera and the hinge member being adjacent and external to the first surface in combination with the first distance being greater than the second distance prevents rotation of the support frame along the axis substantially parallel to the second axis of rotation. In the preferred embodiment, when the support frame is in the second position, the object may be a display screen for a laptop computer, where the second surface is the front of the display screen and the first surface is the back of the display screen.

In the preferred embodiment, the support frame has means to releasably hold and protect the camera during storage. The camera may be rotated about the second axis in a direction from the first and second front support elements towards the rear support element of the support frame until the camera is in a position between and is releasably held by the rear support element and the first and second front support elements. In the preferred embodiment, the rear support element has means to protect a lens of the camera which is a cover mounted at a distal end of the rear support element. The lens of the camera faces a direction of rotation about the second axis from the first and second front support elements to the rear support element of the support frame to allow the lens of the camera to be fitably received into the cover when the camera is releasably held between the rear support element and the first and second front support elements.

In the preferred embodiment, the first and second front support elements are spaced a distance apart at a distance less than a diameter of a housing of the camera, where the camera is rotated about the second axis in the direction towards the rear support element so that the housing passes between the first and second front support elements. The first and second front support elements resiliently and outwardly flex to accommodate passage of the housing. The housing is releasably held after passing between the first and second front support elements by the rear support element engaging the housing at the lens, where the first and second front support elements engage the housing backside at a first indentation and a second indentation respectively to resiliently urge the housing towards the rear support element.

In the preferred embodiment, the hinge member is further comprised of a body having a proximal and a distal end where a pivot element at the proximal end of the body rotatably attaches the camera to the body so that the camera rotates about the first axis relative to the body. A hinge element at the distal end of the body hingedly attaches the body to the support frame so that the body rotates about the second axis relative to the support frame. In the preferred embodiment, the camera has an electrical wiring harness to couple from an interior to an exterior of the camera, and the pivot element has a bore parallel to the first axis of rotation to receive the electrical wiring harness to pass the wiring harness from the interior to the exterior of the camera.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 1 is a perspective view of the "Camera Clip" invention;

FIG. 2 is a side view showing a first mode of a preferred embodiment of the present invention;

FIG. 3 is a detailed front view of the "Camera Clip" invention;

FIG. 4 is a side view showing a second mode of the preferred embodiment of the present invention;

FIG. 5 is a side view showing a third mode of the preferred embodiment of the present invention;

FIG. 6 is a detailed side view showing the third mode wherein the lens of the camera is being fitably received by the cover; and FIG. 7 is a front view showing the third mode of the preferred embodiment of the present invention.

DETAILED DESCRIPTION OF THE PREFERRED EMBODIMENTS

Referring now to the drawings, wherein like reference numerals refer to like elements throughout the several views, FIG. 1 is a perspective view of the camera clip invention. FIG. 1 shows generally a camera apparatus 10 having a camera 12 and a camera clip 14. Camera clip 14 is further comprised of a hinge member 16 and a support frame 18. Camera 12 is comprised of housing 20 and lens 22, and has a housing backside 24 which is the side of the housing opposite of lens 22. Hinge member 16 is rotatably attached to camera 12, where camera 12 rotates over a first axis 26 in a direction shown by arrow 28 relative to hinge member 16. Support frame 18 is hingedly attached to hinge member 16 to engagingly support hinge member 16 on an object 30 (see also, FIG. 2). Hinge member 16 rotates over a second axis 32 in the direction shown by arrow 34 relative to support frame 18. First axis 26 is perpendicular to second axis 32. Second axis 32 is substantially parallel to a first surface 36 when hinge member 16 is engagingly supported on object 30 (see also, FIG. 2). Support frame 18 has a first portion consisting of first support element 38 and a second portion consisting of a first front support element 40 and a second front support element 42. Housing 20 has a first indentation 25 and a second indentation 27 to slidably and fittably receive distal end 41 of first front support element 40 and distal end 43 of second front support element 42 when first front support element 40 and second front support element 42 are rotated in the direction of arrow 34 to engage housing backside 24.

FIG. 2 is a side view showing a first mode of a preferred embodiment of the present invention. Rear support element 38, first front support element 40 and second front support element 42 support camera 12 in the first position 44, on the first surface 36, when rear support element 38, first front support element 40 and second front support element 42 are engaging first surface 36 and first surface 36 is substantially level. In the first position 44, camera 12 may be pivoted upon support frame 18 from a position 46 to a position 48. It is recognized that camera 12 may be pivoted to any number of positions about second axis 32 in the direction shown by arrow 34. In the preferred embodiment, rear support element 38, first front support element 40 and second front support element 42 support the camera in first position 44, on first surface 36, when rear support element 38, first front support element 40 and second front support element 42 engage first surface 36 at three locations in a plane 50 of first surface 36. Engagement of first surface 36 at three or more locations prevents rotation of support frame 18 relative to first surface 36 in any direction within plane 50 of first surface 36. It is understood that in the preferred embodiment, rear support element 38, first front support element 40 and second front support element 42 may utilize any number of desired geometries to engage first surface 36 to prevent rotation of support frame 18 relative to first surface 36 in any direction within plane 50 of first surface 36. In the preferred embodiment, when support frame 18 is in the first position 44, the object may be a top of a table and first surface 36 may be a top surface of the table. Likewise, object 30 may be a desk top, where first surface 36 is a top surface of the desk.

FIG. 4 is a side view showing a second mode of the preferred embodiment of the present invention. The second mode occurs when rear support element 38, first front support element 40 and second front support element 42 support camera 12 in a second position 52 on a first surface 54 adjacent an edge 56. Second position 52 corresponds to first surface 54 being inclined from the substantially level position (see also, FIG. 2). In FIG. 4, object 58 has a second surface 60, where a thickness d1 between first surface 54 and second surface 60 defines the edge 56 therebetween. Camera 12 is maintained adjacent edge 56 in second position 52 when the uppermost portion of object 58 is edge 56. Rear support element 38 engages first surface 54, and first front support element 40 and second front support element 42 engage edge 56 and second surface 60. Rear support element 38, first front support element 40 and second front support element 42, in combination, maintain camera 12 adjacent edge 56 and prevent rotation of support frame 18 along an axis substantially parallel to second axis 32, where second axis 32 is substantially parallel to edge 56. Rear support element 38, first front support element 40 and second front support element 42 support camera 12 in second position 52 on the first surface 54 adjacent edge 56 when a first distance 64 measured between edge 56 and position 66 is greater than a second distance 68. Second distance 68 is measured between edge 56 and position 70, where first front support element 40 and second front support element 42 engage second surface 60. The center of gravity shown in the direction of arrow 72 of camera 12 and hinge member 16 being adjacent and external to first surface 54 in combination with first distance 64 being greater than second distance 68 prevent rotation in the direction of arrow 62 of support frame 18. In the preferred embodiment, object 58 may be a display screen for a laptop computer when support frame 18 is in second position 52, where second surface 60 is the front of the display screen and first surface 54 is the back of the display screen. FIG. 4 shows hinge member 16 comprised of a body 74 having a proximal end 76 and a distal end 78. A pivot element 80 at proximal end 76 of body 74 rotatably attaches camera 12 to body 74 so the camera may rotate about first axis 26 relative to body 74. A hinge element 82 at distal end 78 of body 74 hingedly attaches body 74 to support frame 18 so body 74 rotates about second axis 32 relative to support frame 18. FIG. 4 further shows camera 12 having an electrical wiring harness 84 to couple from an interior 86 to an exterior 88 of camera 12. Pivot element 80 has a bore 90 parallel to first axis 26 to receive electrical wiring harness 84 to pass wiring harness 84 from interior 86 to exterior 88 of camera 12. While the embodiments shown in the drawing figures and discussed herein illustrate a wiring harness 84 passing through a bore 90 parallel to first axis 26, it will be understood that other embodiments are contemplated. For example, wiring harness could enter body 74 at a location angularly spaced upward from bore 90.

FIGS. 5–7 show various perspectives of a third mode of the preferred embodiment of the present invention. FIG. 5 is a side view, FIG. 6 is a detailed side view showing the lens of the camera being fitably received by the cover, and FIG. 7 is a front view. The third mode of the preferred embodiment of the present invention is shown when camera 12 is rotated about second axis 32 along the direction shown by arrow 34 in a direction from the first front support element 40 and the second front support element 42 towards rear support element 38 of support frame 18. This rotation is continued in the third mode until camera 12 is in a position between rear support element 38 and first front support element 40 and second front support element 42. In this position, distal end 41 of first support element 40 and distal end 43 of second front support element 42 slidably and fittably engage first indentation 25 and second indentation 27 respectively of housing 20 at housing backside 24. Camera 12 is then releasably held between rear support element 38 and first front support element 40 and second front support element 42. Rear support element 38 further has means to protect a lens 22 of camera 12, which is cover 90. Cover 90 is mounted at a distal end 92 of rear support element 38. Lens 22 of camera 12 faces in the direction of arrow 92, which is the direction of rotation about second axis 32 from first front support element 40 and second front support element 42 to rear support element 38 of support frame 18. Cover 90 fitably receives lens 22 of camera 12. Cover 90 has a raised portion 95 sized to be accommodated by lens 22 of camera 12. Support frame 14, in a third mode of the preferred embodiment of the present invention, releasably holds and protects camera 12 during storage.

FIG. 3 is a detailed front view of the camera clip invention. FIG. 3 shows first front support element 40 and second front support element 42 being spaced a distance apart by a distance 94. Camera 12 further has a housing 20 which may be spherical in shape in the preferred embodiment. Housing 20 has a diameter shown as distance 96, wherein the preferred embodiment, distance 96 is greater than distance 94. When camera 12 is rotated about the second axis 32 in the direction towards rear support element 38 in the direction of arrow 92 so that housing 20 passes between first front support element 40 and second front support element 42, first front support element 40 and second front support element 42 resiliently and outwardly flex to accommodate passage of housing 20. Housing 20 is releasably held once passing between first front support element 40 and second front support element 42 by rear support element 38 engaging housing 20 at lens 22 and distal end 41 of first front support element 40 and distal end 43 of second front support element 42 slidably and fittably engaging first indentation 25 and second indentation 27 respectively of housing 20 at housing backside 24. When housing 20 is releasably held, first front support element 40 and second front support element 42 resiliently urge housing 20 towards rear support element 38 so that lens 22 of camera 12 is fitably received into cover 90.

Having thus described the preferred embodiments of the present invention, those of skill in the art will readily appreciate that yet other embodiments may be made and used within the scope of the claims hereto attached.

What is claimed:

1. Apparatus for supporting a camera, having a lens, on any generally horizontal, substantially planar surface and on an object having a first surface and a second surface and an edge intersecting the first surface and the second surface, comprising:

a. a hinge member adapted to be rotatably attached to the camera, said camera, when the hinge member is so attached, rotating, about a first axis of rotation, relative to said hinge member; and b. a support frame rotatably attached to said hinge member and configured to support said hinge member on the surface and the object, said hinge member rotating about a second axis of rotation relative to said support frame, said first axis of rotation being generally perpendicular to said second axis of rotation, said second axis of rotation being substantially parallel to the first surface when said hinge member is supported on the object, said support frame having a first disposition positioned on said generally horizontal, substantially planar surface, and said support frame having a second disposition attached to the object when said first surface and said second surface are inclined from a generally horizontal orientation, the camera being maintained adjacent said edge in said second disposition of said support frame.

2. Apparatus according to claim 1 wherein the support frame comprises a first portion and a second portion, the support frame being in the first disposition on the generally horizontal, substantially planar surface when distal extremities of said first portion and said second portion are engaging the generally horizontal, substantially planar surface, and the support frame being in the second disposition on the object when said first portion is engaging the first surface and said second portion is engaging the second surface, said first portion and said second portion in combination maintaining the camera adjacent the edge.

3. Apparatus according to claim 2 wherein the support frame includes a cover adapted to protect the camera lens when the camera is rotated about the second axis until the camera is between the first portion and the second portion.

4. Apparatus according to claim 3 wherein the first portion of the support frame further includes said cover, said cover being mounted at the distal end of the first portion and adapted the lens of the camera.

5. Apparatus according to claim 2 wherein the support frame is in the first disposition when the first portion and the second portion engage the generally horizontal, substantially planar surface at three or more locations in a common plane, thereby preventing rotation of the support frame relative to the generally horizontal, substantially planar surface in any direction.

6. Apparatus according to claim 2 wherein the support frame is in the second disposition when a first distance from the edge to a location where the first portion engages the first surface is greater than a second distance from the edge to a location where the second portion engages the second surface, thus preventing rotation of the support frame.

7. Apparatus according to claim 1 wherein the object is a display screen for a laptop computer, and the second surface is the front of the display screen and the first surface is the back of the display screen.

8. Apparatus according to claim 1 wherein the hinge member includes a body having a proximal and a distal end, a pivot element at said proximal end of said body adapted to rotatably attach the camera to the body so that the camera rotates about the first axis relative to the body, and a hinge element at said distal end of said body hingedly attaching said body to the support frame so that said body rotates, about the second axis, relative to the support frame.

9. Apparatus according to claim 8 wherein the pivot element has a bore along the first axis of rotation to receive an electrical wiring harness and pass said wiring harness to the camera.

10. Apparatus for supporting a camera, having a housing and a lens, on any generally horizontal, substantially planar surface and on an object having a first surface and a second surface, and an edge intersecting the first surface and the second surface, comprising:
   a. a hinge member adapted to be rotatably attached to the camera, said camera, when the hinge member is so attached, rotating, about a first axis of rotation relative to said hinge member; and
   b. a support frame rotatably attached to said hinge member and configured to support said hinge member on the surface and the object, said hinge member rotating about a second axis of rotation relative to said support frame, said first axis of rotation being generally perpendicular to said second axis of rotation, said second axis of rotation being substantially parallel to the first surface when said hinge member is supported on the object, the support frame having a rear support element and a first and a second front support element, said support frame having a first disposition positioned on said generally horizontal, substantially planar surface when said rear support element and said first and second front support elements are engaging said generally horizontal, substantially planar surface, said support frame having a second disposition attached to the object when the first surface is inclined from a substantially horizontal position so that an uppermost extremity of the object is the edge, the support frame being maintained in said second disposition by said rear support element engaging said first surface and said first and second front support elements engaging the second surface, said rear support element and said first and second front support elements in combination preventing rotation of the support frame.

11. Apparatus according to claim 10 wherein the support frame adapted to protect the camera when the camera is rotated about the second axis towards the rear support element of the support frame until the camera is between the rear support element and the first and second front support elements, and is releasably held between the rear support element and the first and second front support elements.

12. Apparatus according to claim 11 wherein the first and second front support elements are spaced a distance apart, and wherein said distance is less than a diameter of the housing of the camera so that as the camera is being rotated about the second axis in the direction towards the rear support element, said housing passes between the first and second front support elements and the first and second front support elements resiliently flex outwardly to accommodate passage of said housing, said housing being releasably held once passing between the first and second front support elements by the rear support element engaging said housing at the lens.

13. Apparatus according to claim 11 wherein the first portion of the support frame further has a cover, said cover being mounted at a distal end of the rear support element and adapted to receive the lens of the camera when the camera is releasably held between the rear support element and the first and second front support elements.

14. Apparatus according to claim 10 wherein the support frame is in the first disposition when the rear support element and the first and second front support elements engage the generally horizontal, substantially planar surface at three or more locations in a common plane of the generally horizontal, substantially planar surface to prevent rotation of the support frame relative to the generally horizontal, substantially planar surface.

15. Apparatus according to claim 10 wherein the support frame is in the first disposition positioned on the generally horizontal, substantially planar surface when the rear support element and the first and second front support elements engage the generally horizontal, substantially planar surface to prevent rotation of the support frame relative to the generally horizontal, substantially planar surface.

16. Apparatus according to claim 10 wherein support frame is in the second disposition when a first distance from the edge to a location where the rear support element engages the first surface is greater than a second distance from the edge to a location where the first and second front support elements engage the second surface, the first distance being greater than the second distance thus preventing rotation of the support frame.

17. Apparatus according to claim 10 wherein the hinge member includes a body having a proximal and a distal end, a pivot element at said proximal end of said body adapted to rotatably attach the camera to the body so that the camera rotates about the first axis relative to the body, and a hinge element at said distal end of said body hingedly attaching said body to the support frame so that said body rotates about the second axis relative to the support frame.

18. Apparatus according to claim 17 wherein the pivot element has a bore along the first axis of rotation to receive said electrical wiring harness and pass said wiring harness to the camera.

19. A camera clip for supporting a camera on a laptop computer, the laptop computer having a display screen which can be inclined from a generally horizontal position, an uppermost portion of the display screen defining an edge, comprising:

a. a hinge member adapted to be rotatably attached to the camera, said camera rotating about a first axis of rotation relative to said hinge member; and b. a support frame hingedly attached to said hinge member to engagingly support said hinge member on the display screen, said hinge member rotating over a second axis of rotation relative to said support frame, the camera being maintained adjacent the edge, rotation of said support frame being prevented along an axis substantially parallel to said second axis where said second axis is substantially parallel to said edge.

20. Apparatus for supporting a camera having a lens on a substantially level surface, comprising:

a. a hinge member adapted to be rotatably attached to the camera, the camera rotating about a first axis of rotation relative to said hinge member; and b. a support frame rotatably attached to said hinge member and configured to support said hinge member on a generally horizontal, substantially planar surface, said hinge member rotating about a second axis of rotation relative to said support frame, said first axis of rotation being generally perpendicular to said second axis of rotation, said second axis of rotation being substantially parallel to the generally horizontal, substantially planar surface when said hinge member is supported on the generally horizontal, substantially planar surface, said support frame having a first portion and a second portion wherein said support frame protects the camera when said hinge member is not supported on the generally horizontal, substantially planar surface, and when the camera is rotated around said second axis in a direction from said second portion towards said first portion of said support frame until the camera is between said first portion and said second portion and is releasably held between said first portion and said second portion.

21. Apparatus for supporting a camera, having a lens, on an object having a first surface and a second surface, wherein a thickness measured between the first surface and the second surface defines an edge therebetween, comprising:

a. a hinge member adapted to be rotatably attached to the camera, said camera, when the hinge member is so adapted, rotating about a first axis of rotation relative to said hinge member; and b. a support frame rotatably attached to said hinge member and configured to support said hinge member on the object, said hinge member rotating about a second axis of rotation relative to said support frame, said first axis of rotation being generally perpendicular to said second axis of rotation, said second axis of rotation being substantially parallel to the first surface when said hinge member is supported by said support frame on the object, said support frame supporting said hinge member on the object when said first surface is inclined from a substantially horizontal position, the camera being maintained adjacent the edge when an uppermost extremity of the object is the edge, rotation of said support frame being precluded about an axis substantially parallel to said second axis, said second axis being substantially parallel to said edge, said support frame having a first portion and a second portion wherein said support frame releasably holds and protects the camera when said hinge member is not supported by said support frame on the object and the camera is rotated around said second axis in a direction from said second portion towards said first portion of said support frame until the camera is between said first portion and said second portion and is releasably held between said first portion and said second portion.

* * * * *

(12) EX PARTE REEXAMINATION CERTIFICATE (9454th)

United States Patent
Krekelberg

(10) Number: US 5,855,343 C1
(45) Certificate Issued: Dec. 26, 2012

(54) CAMERA CLIP

(75) Inventor: David E. Krekelberg, Minnetonka, MN (US)

(73) Assignee: Globalmedia Group, LLC, Scottsdale, AZ (US)

Reexamination Request:
No. 90/011,366, Dec. 6, 2010
No. 90/011,316, Dec. 30, 2010

Reexamination Certificate for:
Patent No.: 5,855,343
Issued: Jan. 5, 1999
Appl. No.: 08/814,168
Filed: Mar. 7, 1997

(51) Int. Cl.
*A47G 29/00* (2006.01)
*F16L 3/00* (2006.01)
(52) U.S. Cl. .................. 248/121; 248/126; 248/918
(58) Field of Classification Search .................. None
See application file for complete search history.

(56) References Cited

To view the complete listing of prior art documents cited during the proceedings for Reexamination Control Numbers 90/011,366 and 90/011,316, please refer to the USPTO's public Patent Application Information Retrieval (PAIR) system under the Display References tab.

*Primary Examiner* — William Doerrler

(57) ABSTRACT

A clip for supporting a portable camera either on a surface or on an edge of a housing, and for protecting the lens of the camera when the camera is not being supported. The clip provides two axis of rotation to position the camera to any desired viewing angle. The clip may be rotated to a first position to support the camera on a surface of a table or desk. The clip may be rotated to a second position to support the camera on the display screen of a laptop computer. When the camera is not being supported in the first position or the second position, the camera may be rotated to be releasably held by the clip to protect the camera and lens during storage.

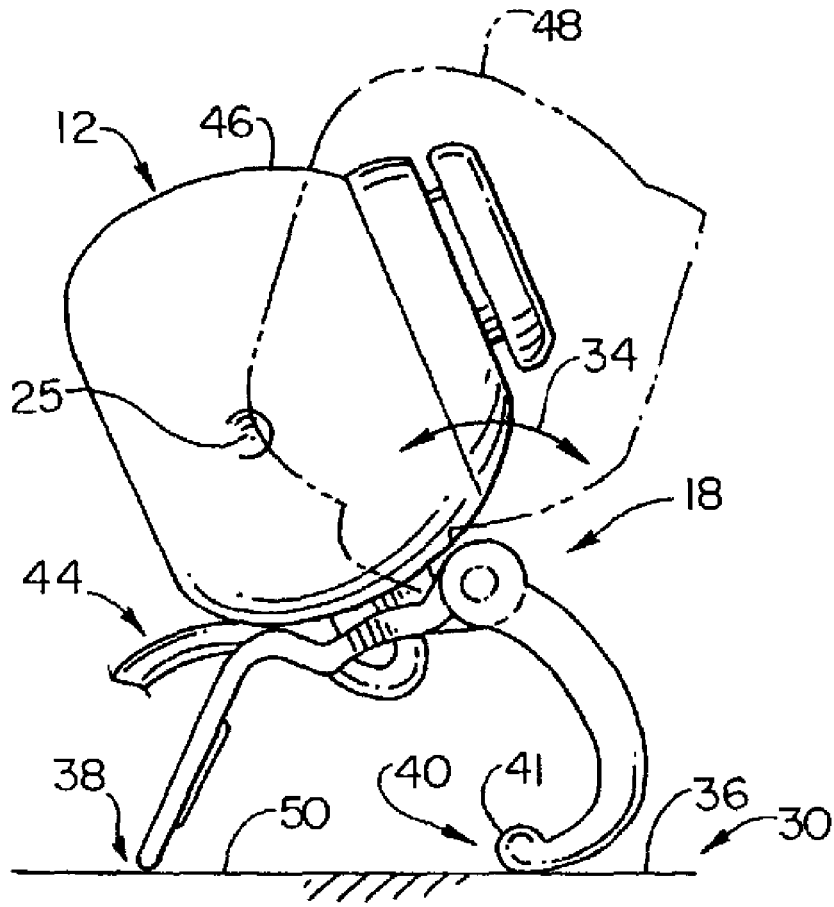

US 5,855,343 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 5-8, 10, 14-17 and 19 are cancelled.

New claims 22-48 are added and determined to be patentable.

Claims 3, 4, 9, 11-13, 18, 20 and 21 were not reexamined.

*22. Apparatus for supporting a camera, having a lens, on any generally horizontal, substantially planar surface and on an object having a first surface and a second surface and an edge intersecting the first surface and the second surface, comprising:*
  *a. a hinge member adapted to be rotatably and permanently attached to the camera, said camera, when the hinge member is so permanently attached, rotating, about a first axis of rotation, relative to said hinge member; and*
  *b. a support frame rotatably attached to said hinge member and configured to support said hinge member on the surface and the object, said hinge member rotating about a second axis of rotation relative to said support frame, said first axis of rotation being generally perpendicular to said second axis of rotation, said second axis of rotation being substantially parallel to the first surface when said hinge member is supported on the object, said support frame having a first disposition positioned on said generally horizontal, substantially planar surface, and said support frame having a second disposition attached to the object when said first surface and said second surface are inclined from a generally horizontal orientation, the camera being maintained adjacent said edge in said second disposition of said support frame.*

*23. The apparatus of claim 22, wherein said hinge member consists of a single, unitary body.*

*24. The apparatus of claim 22, wherein said hinge member consists of a single piece of material.*

*25. The apparatus of claim 22, wherein said hinge member consists of a unitary piece of material.*

*26. The apparatus of claim 22, wherein said hinge member is adapted to be inserted inside a housing of said camera for rotatably attaching said hinge member to said camera.*

*27. The apparatus of claim 22, wherein said hinge member comprises a lip adapted for rotatably attaching said hinge member to said camera.*

*28. The apparatus of claim 22, wherein said hinge member comprises a neck having a lip, with said lip adapted for rotatably attaching said hinge member to said camera, wherein said lip has a wider circumference than said neck.*

*29. The apparatus of claim 22, wherein said hinge member supports said camera from the bottom of said camera.*

*30. The apparatus of claim 22, wherein said hinge member is rotatably attached to said camera at the bottom of said camera, and wherein said hinge member is rotatably attached to said support frame at the top of said support frame.*

*31. Apparatus for supporting a camera, having a lens, on any generally horizontal, substantially planar surface and on an object having a first surface and a second surface and an edge intersecting the first surface and the second surface, comprising:*
  *a. a hinge member adapted to be rotatably attached to the camera, said camera, when the hinge member is so attached, rotating, about a first axis of rotation, relative to said hinge member, wherein said hinge member consists of a single, unitary body; and*
  *b. a support frame rotatably attached to said hinge member and configured to support said hinge member on the surface and the object, said hinge member rotating about a second axis of rotation relative to said support frame, said first axis of rotation being generally perpendicular to said second axis of rotation, said second axis of rotation being substantially parallel to the first surface when said hinge member is supported on the object, said support frame having a first disposition positioned on said generally horizontal, substantially planar surface, and said support frame having a second disposition attached to the object when said first surface and said second surface are inclined from a generally horizontal orientation, the camera being maintained adjacent said edge in said second disposition of said support frame.*

*32. The apparatus of claim 30, wherein said hinge member is rotatably and permanently attached to the camera.*

*33. The apparatus of claim 30, wherein said hinge member consists of a single piece of material.*

*34. The apparatus of claim 31, wherein said hinge member consists of a unitary piece of material.*

*35. The apparatus of claim 31, wherein said hinge member is adapted to be inserted inside a housing of said camera for rotatably attaching said hinge member to said camera.*

*36. The apparatus of claim 31, wherein said hinge member comprises a lip adapted for rotatably attaching said hinge member to said camera.*

*37. The apparatus of claim 31, wherein said hinge member comprises a neck having a lip, with said lip adapted for rotatably attaching said hinge member to said camera, wherein said lip has a wider circumference than said neck.*

*38. The apparatus of claim 31, wherein said hinge member supports said camera from the bottom of said camera.*

*39. The apparatus of claim 31, wherein said hinge member is rotatably attached to said camera at the bottom of said camera, and wherein said hinge member is rotatably attached to said support frame at the top of said support frame.*

*40. Apparatus for supporting a camera, having a lens, on any generally horizontal, substantially planar surface and on an object having a first surface and a second surface and an edge intersecting the first surface and the second surface, comprising:*
  *a. a hinge member adapted to be permanently rotatably attached to the camera, said camera, when the hinge member is so permanently rotatably attached, rotating, about a first axis of rotation, relative to said hinge member; and*
  *b. a support frame permanently rotatably attached to said hinge member and configured to support said hinge member on the surface and the object, said hinge member rotating about a second axis of rotation relative to said support frame, said first axis of rotation being generally perpendicular to said second axis of rotation, said second axis of rotation being substantially parallel to* the first surface when said hinge member is supported on the object, said support frame having a first disposition positioned on said generally horizontal, substantially planar surface, and said support frame having a second disposition attached to the object when said first surface and said second surface are inclined from a generally horizontal orientation, the camera being maintained adjacent said edge in said second disposition of said support frame.

41. Apparatus for supporting a camera, having a lens, on any generally horizontal, substantially planar surface and on an object having a first surface and a second surface and an edge intersecting the first surface and the second surface, comprising:
   a. a hinge member adapted to be permanently rotatably joined to the camera, said camera, when the hinge member is so permanently rotatably joined, rotating, about a first axis of rotation, relative to said hinge member; and
   b. a support frame permanently rotatably joined to said hinge member and configured to support said hinge member on the surface and the object, said hinge member rotating about a second axis of rotation relative to said support frame, said first axis of rotation being generally perpendicular to said second axis of rotation, said second axis of rotation being substantially parallel to the first surface when said hinge member is supported on the object, said support frame having a first disposition positioned on said generally horizontal, substantially planar surface and said support frame having a second disposition attached to the object when said first surface and said second surface are inclined from a generally horizontal orientation, the camera being maintained adjacent said edge in said second disposition of said support frame.

42. The apparatus of claim 1, wherein said hinge member is adapted to be inserted inside a housing of said camera for permanently rotatably attaching said hinge member to said camera.

43. The apparatus of claim 1, wherein said hinge member is adapted to be inserted inside a joint within a housing of said camera for rotatably attaching said hinge member to said camera.

44. Apparatus for supporting a camera, having a lens, on any generally horizontal, substantially planar surface and on an object having a first surface and a second surface and an edge intersecting the first surface and the second surface, comprising:
   a. a hinge member adapted to be rotatably attached to the camera, said camera, when the hinge member is so attached, rotating, about a first axis of rotation, relative to said hinge member, wherein said hinge member comprises a lip adapted for rotatably attaching said hinge member to said camera.; and
   b. a support frame rotatably attached to said hinge member and configured to support said hinge member on the surface and the object, said hinge member rotating about a second axis of rotation relative to said support frame, said first axis of rotation being generally perpendicular to said second axis of rotation, said second axis of rotation being substantially parallel to the first surface when said hinge member is supported on the object, said support frame having a first disposition positioned on said generally horizontal, substantially planar surface, and said support frame having a second disposition attached to the object when said first surface and said second surface are inclined from a generally horizontal orientation, the camera being maintained adjacent said edge in said second disposition of said support frame.

45. Apparatus for supporting a camera, having a lens, on any generally horizontal, substantially planar surface and on an object having a first surface and a second surface and an edge intersecting the first surface and the second surface, comprising:
   a. a hinge member adapted to be rotatably attached to the camera, said camera, when the hinge member is so attached, rotating, about a first axis of rotation, relative to said hinge member, wherein said hinge member comprises a neck having a lip, with said lip adapted for rotatably attaching said hinge member to said camera, wherein said lip has a wider circumference than said neck; and
   b. a support frame rotatably attached to said hinge member and configured to support said hinge member on the surface and the object, said hinge member rotating about a second axis of rotation relative to said support frame, said first axis of rotation being generally perpendicular to said second axis of rotation, said second axis of rotation being substantially parallel to the first surface when said hinge member is supported on the object, said support frame having a first disposition positioned on said generally horizontal, substantially planar surface, and said support frame having a second disposition attached to the object when said first surface and said second surface are inclined from a generally horizontal orientation, the camera being maintained adjacent said edge in said second disposition of said support frame.

46. Apparatus for supporting a camera, having a lens, on any generally horizontal, substantially planar surface and on an object having a first surface and a second surface and an edge intersecting the first surface and the second surface, comprising:
   a. a hinge member adapted to be rotatably attached to the camera, said camera, when the hinge member is so attached, rotating, about a first axis of rotation, relative to said hinge member; and
   b. a support frame rotatably attached to said hinge member and configured to support said hinge member on the surface and the object, wherein the support frame has a front support element and rear support element, and wherein the front support element is configured to engage the object at the intersection of the first surface and the edge, and at the intersection of the second surface and the edge, when said first surface and said second surface are inclined from a generally horizontal orientation, said hinge member rotating about a second axis of rotation relative to said support frame, said first axis of rotation being generally perpendicular to said second axis of rotation, said second axis of rotation being substantially parallel to the first surface when said hinge member is supported on the object, said support frame having a first disposition positioned on said generally horizontal, substantially planar surface, and said support frame having a second disposition attached to the object when said first surface and said second surface are inclined from a generally horizontal orientation, the camera being maintained adjacent said edge in said second disposition of said support frame.

47. Apparatus for supporting a camera, having a lens, on any generally horizontal, substantially planar surface and on an object having a first surface and a second surface and an edge intersecting the first surface and the second surface, comprising:

a. a hinge member adapted to be rotatably attached to the camera, said camera, when the hinge member is so attached, rotating, about a first axis of rotation, relative to said hinge member; and b. a support frame rotatably attached to said hinge member and configured to support said hinge member on the surface and the object, wherein the support frame has a front support element and rear support element, and wherein the front support element is configured to engage the object at the intersection of the first surface and the edge, at the intersection of the second surface and the edge, and at the second surface, when said first surface and said second surface are inclined from a generally horizontal orientation, said hinge member rotating about a second axis of rotation relative to said support frame, said first axis of rotation being generally perpendicular to said second axis of rotation, said second axis of rotation being substantially parallel to the first surface when said hinge member is supported on the object, said support frame having a first disposition positioned on said generally horizontal, substantially planar surface, and said support frame having a second disposition attached to the object when said first surface and said second surface are inclined from a generally horizontal orientation, the camera being maintained adjacent said edge in said second disposition of said support frame.

48. The hinge member of claim 1, wherein the support frame has a front support element and rear support element, wherein the front support element is configured to sit atop a portion of a length of the edge between the first surface and the second surface when said first surface and said second surface are inclined from a generally horizontal orientation.

\* \* \* \* \*